US012779684B2

(12) United States Patent
Agarwal et al.

(10) Patent No.: US 12,779,684 B2
(45) Date of Patent: Nov. 3, 2026

(54) SYSTEMS AND METHODS FOR AUTOMATIC TASK PLANNING FOR MACHINE TENDING ROBOTIC APPLICATIONS

(71) Applicant: Intrinsic Innovation LLC, Mountain View, CA (US)

(72) Inventors: Abhishek Agarwal, San Francisco, CA (US); Tim Niemueller, Gauting (DE); Dirk Holz, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 9 days.

(21) Appl. No.: 19/172,361

(22) Filed: Apr. 7, 2025

(65) Prior Publication Data

US 2026/0307249 A1 Oct. 8, 2026

(51) Int. Cl.
*B25J 9/16* (2006.01)

(52) U.S. Cl.
CPC .................................. *B25J 9/1661* (2013.01)

(58) Field of Classification Search
CPC ...................................................... B25J 9/1661
See application file for complete search history.

(56) References Cited

U.S. PATENT DOCUMENTS

| | | | |
|---|---|---|---|
| 11,820,014 B2 | 11/2023 | Kolluri et al. | |
| 12,502,773 B2 | 12/2025 | Gaschler et al. | |
| 12,521,871 B2 | 1/2026 | Kelch et al. | |
| 2024/0157561 A1* | 5/2024 | D'Amelio .............. | B25J 9/1679 |

OTHER PUBLICATIONS

Karami et al. A Task and Motion Planning Framework Using Iteratively Deepened and/or Graph Networks, Mar. 10, 2025 (Year: 2025).*

Github.com [online], "caelan/pddlstream," Jun. 27, 2018, retrieved on Mar. 9, 2026, retrieved from URL <https://github.com/caelan/pddlstream>, 10 pages.

* cited by examiner

*Primary Examiner* — Adam R Mott
*Assistant Examiner* — Heather J Keniry
(74) *Attorney, Agent, or Firm* — Fish & Richardson P.C.

(57) ABSTRACT

Methods, systems, and apparatus, including computer programs encoded on computer storage media, for automatically generating a plan for a robot to execute in a machine tending robotic application. One or the methods includes receiving data defining one or more poses of a workpiece to be manipulated by a machine tended by a robot and generate a respective graph representing the one or more states of the workpiece during the manipulation process and the one or more tasks that transform the workpiece from one state to another. A behavior tree corresponding to the plan is provided by selecting a path through the graph and transforming the sequence of tasks in the selected path into a behavior tree.

18 Claims, 8 Drawing Sheets

SYSTEMS AND METHODS FOR AUTOMATIC TASK PLANNING FOR MACHINE TENDING ROBOTIC APPLICATIONS

BACKGROUND

This specification relates to robotics, and more particularly to task planning for machine tending applications.

A machine tending application generally refers to an industrial process in which a particular type of machine has to be tended by an operator in order to manipulate a workpiece. Machine tending applications can include, but are not limited to bending, stamping, welding, assembly and packaging, and grinding and/or polishing a workpiece.

Some attempts have been made to use robots for machine tending applications rather than human operators. However, machine tending applications introduce several aspects of complexity that makes using robots very tedious and brittle. One example of this complexity is that a robot must keep itself out of the tended machine. Another example of this complexity is that a workpiece must often be placed into the tended machine multiple times, which is often not feasible if the robot is grasping the workpiece at an area that needs to be manipulated. Therefore, using robots for machine tending applications has traditionally required immense amounts of manual programming in order to meticulously dictate how robot components should move in order to accomplish a particular task. Manual programming is tedious, time-consuming, and error prone. This can pose a particular problem when introducing new tasks for the robot or new parts, e.g., a new type of gripper or a new type of workpiece, as all the information regarding the new addition must be manually reprogrammed.

SUMMARY

This specification describes an automated task planning system for machine tending robotic applications. More specifically, the system can automatically choose a plan and generate a corresponding behavior tree representing the plan for a robot to execute in a machine tending application.

In this specification, a behavior tree is a graph-based data structure representing a task plan for a robotic process. A behavior tree has nodes and links, with the links establishing parent-child relationships between nodes. A robotic execution system can use a behavior tree to execute a robotic process by stepping through the nodes according to the node semantics of the different types of nodes. As one example, a sequence node having four action nodes as children can represent that the robot should execute the four action nodes, e.g., tasks, in the specified sequence.

In this specification, a task plan can generally refer to a sequence of tasks that can be completed to execute a robotic process. For example, a task plan can refer to the sequence of tasks that can be completed to bend a sheet of metal into a particular shape. More specifically, the task plan can include tasks such as picking up the sheet of metal, placing the sheeting of metal into a bending machine, bending the sheet of metal, and removing the now-bent sheet of metal from the bending machine.

Particular embodiments of the subject matter described in this specification can be implemented so as to realize one or more of the following advantages.

Manual task planning can be resource intensive and complex, especially when introducing additional parts/tools of the robot or tasks. The automated task planning system described in this specification can automate the existing task planning processing to generate a task plan in a quick and efficient manner, saving resources.

Furthermore, the automated task planning system can generate task plans utilizing the knowledge of the robot, the tools, the machine, and the operating environment while validating for feasibility, simplifying a previously complex process. Conventional task planning typically requires manual adaptation of a general plan for a particular problem and/or application. In contrast, the task planning system described in this disclosure can automatically generate an optimized task plan for a specific machine tending application. As an example, the task planning system can automatically generate plans that require multiple bends. As another example, the task planning system can generate plans that require multiple grasps. As another example, the task planning system can generate plans that require multiple grasping tools, e.g., suction grasp and pinch grasp tools.

Additionally, the automated task plan can optimize the behavior tree, and subsequent task plan, based on one or more task planning criteria, such as efficiency, feasibility, and stability. For example, if one or more tools of the robot are feasible for a task, the automated task planning system can choose the faster option. As another example, the automated task planning system can use robot reachability and motion planning tests to check if collision-free motions are possible for performing a task for the particular workpiece and for the particular robotic process, ensuring that the corresponding task process and behavior tree is executable and efficient during runtime of the machine tending application.

The details of one or more embodiments of the subject matter will become apparent from the description, drawings, and the claims. Other features, aspects, and advantages of the subject matter will become apparent from the description, drawings, and the claims.

BRIEF DESCRIPTION OF THE DRAWINGS

Like reference numbers and designations in the various drawings indicate like elements.

DETAILED DESCRIPTION

Figure 1:
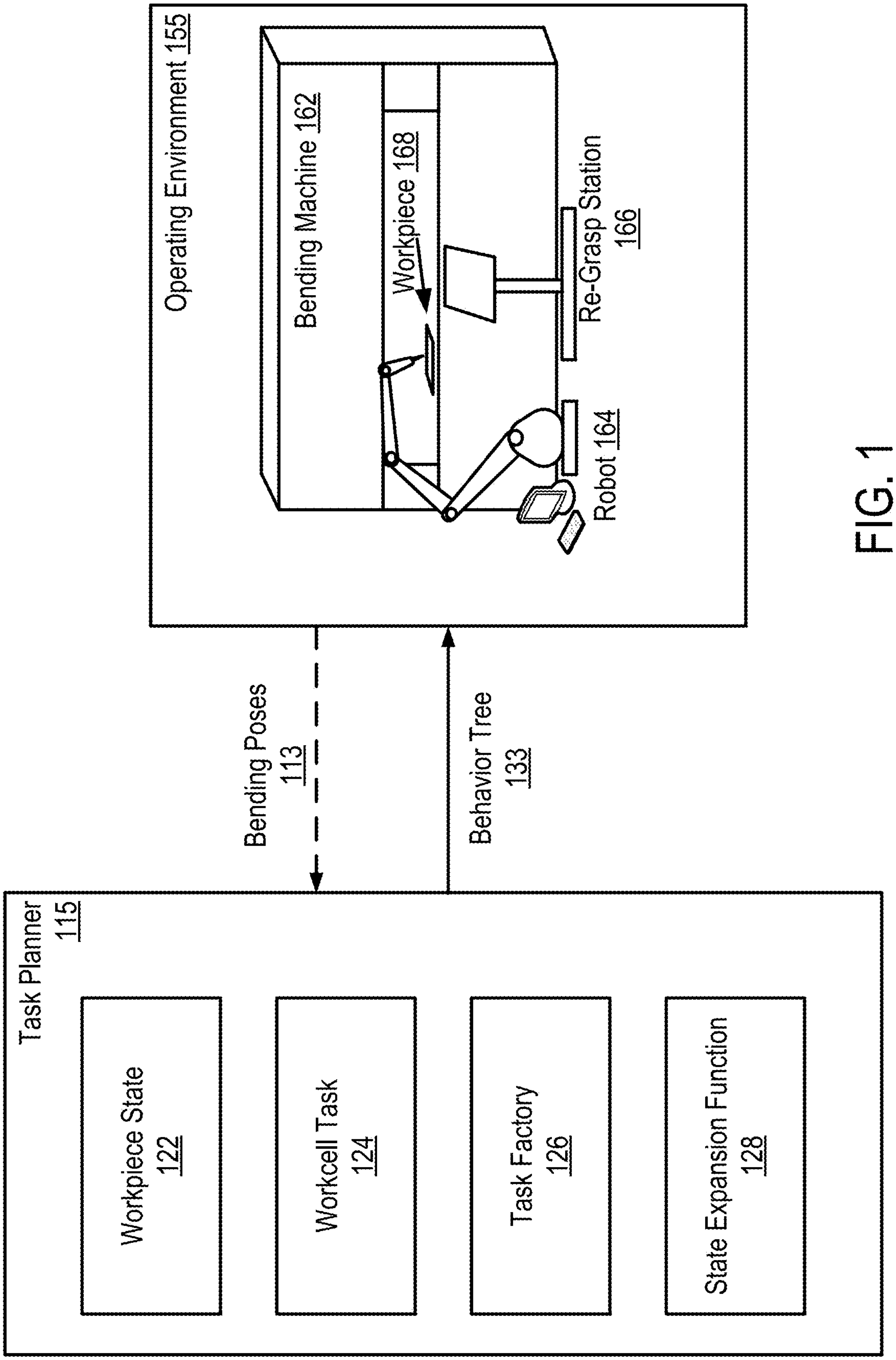
FIG. 1 is an example automated task planning system.

FIG. 1 is a system diagram that illustrates an example automated task planning system 100. The system 100 is an example of a system that can implement the techniques described in this specification. The example system 100 can be implemented as computer programs installed on one or more computers in one or more locations that are coupled to each other through any appropriate communications network, e.g., an intranet or the Internet, or combination of networks.

In particular, the automated task planning system 100 is configured to generate a behavior tree 133 representing a task plan for a robot 164 to execute in a machine tending application.

In some implementations, the automated task planning system 100 can generate another form of output that represents a task plan for a robot 164 to execute in a machine tending application.

The automated task planning system 100 can be utilized in any appropriate machine tending application, including bending, stamping, cutting, welding, assembly and packaging, and grinding and/or polishing a workpiece. As an example, as seen in FIG. 1, the robot 164 can execute a task plan for a bending machine 162.

A robot-tended bending machine, e.g., the bending machine 162, automates the process of bending materials into specific shapes and angles. In a bending application, the robot 165 can execute a task plan that, at a high level, can include picking up a workpiece 168, loading the workpiece 168 into the bending machine 162, bending the workpiece 168, and unloading the bent workpiece from the bending machine 162.

In this specification, a workpiece, e.g., workpiece 168, generally refers to the material or part that is being processed or manipulated by the machine. For example, in a bending application, the workpiece 168 can be a sheet of metal. As another example, in a bending application, the workpiece 168 can be a pipe or a tube, to name just a few examples.

The automated task planning system 100 can include a task planner 115, and a robotic operating environment 155 in which to execute the task plan for a robotic process.

The robotic operating environment 155 can be, for example, a workcell and can include a robot 164 to execute the task plan for the bending process and a bending machine 162.

In some implementations, the robotic operating environment 155 can further include a re-grasping station 166 in which the robot can place the workpiece when switching grasp tools or switching grasp annotations. For example, in a bending application, the robot 164 can place the workpiece 169 in the re-grasping station 166, switch the grasping tool from a suction grasp tool to a pinch grasp tool, and re-grasp the workpiece 168. As another example, the robot 164 can place the workpiece 168 in the re-grasping station 166 to switch the grasp annotation of the workpiece 168 to avoid collisions or other problems when executing the next task of the robotic process.

The robotic operating environment 155 can further include one or more functional components to translate and execute the behavior tree, such as a real-time robotic control system that causes the robot to move the workpiece to each of the one or more poses dictated by the actions of the behavior tree for manipulation of the workpiece with the machine. Suitable real-time robotic control systems for executing behavior trees are described in commonly owned U.S. patent application Ser. No. 17/246,082, filed on Apr. 30, 2021, which is herein incorporated by reference.

In some implementations, the robotic operating environment 155 can further include a user device and one or more functional subsystems including a behavior tree editor, an execution subsystem, and one or more translators that take a behavior tree as input and generate output code that can be executed by the robot to perform the tasks of the behavior tree. Suitable techniques for compiling behavior trees into robot executable code and/or configuring robots to execute behavior trees are described in commonly owned U.S. patent application Ser. No. 18/537,707 filed on Dec. 12, 2023, which is herein incorporated by reference.

At a high level, a real time robotic control system of the operating environment 155 can receive a behavior tree 133 and execute the robotic process represented by the behavior tree 133 by stepping through the nodes, and, at each node, performing an operation represented by the node semantics of the node. Leaf nodes in the behavior tree 133 are action nodes that represent an action for the robot to perform. Thus, when the real-time robotic control system encounters a leaf node, the real-time robotic control system kicks off the appropriate action on the robot 164 in the operating environment 155.

To generate the behavior tree 133, the automated task planning system 100 can utilize a task planner 115. The task planner can be implemented as a software subsystem executed by one or more computers in one or more locations.

The task planner 115 can identify a sequence of tasks to transition from a start state to a goal state using a search graph and generate a behavior tree 133 from the sequence of tasks. That is, the task planner 115 can generate a search graph and determine the sequence of tasks for the behavior tree 133 from a selected path through the search graph.

The task planner 115 can include a workpiece state data structure 122, a workcell task interface 124, a task factory 126, and a state expansion function 128.

The workpiece state data structure 122 is a representation of the workpiece in the operating environment 155. At a high level, the workpiece state data structure 122 can act as a thin representation of the global state by keeping track of the active workpiece instead of the entirety of the operating environment 155.

The workpiece state data structure 122 can include one or more attributes that describe the state of the workpiece, including a phase, a parent, and an alignment attribute.

The workpiece phase attribute represents the phase of the workpiece, e.g., the phase of the robotic process in which the workpiece is in. For example, in a bending application, the phases of the workpiece can include the flat phase of the workpiece, the first bend phase, and the second bend phase.

The workpiece parent attribute represents the workpiece's parent object, e.g., the current component/tool of the robot that is interacting with, processing and/or manipulating the workpiece. For example, in a bending application, the parent objects can include a suction grasp tool, a pinch grasp tool, the aligner, the bending machine, the bending tool, and the outfeed.

The workpiece alignment represents the relative pose of the workpiece with respect to a reference object. For example, the pose can be defined with respect to the parent object. As another example, the pose of the workpiece can be defined with respect to the machine. As another example, the pose of the workpiece can be defined with respect to a reference frame of the workcell.

In some implementations, the workpiece alignment can be represented using a tuple with (i) a first term representing the frame of the workpiece with respect to the machine, (ii) a second term representing the frame of the parent object with respect to the machine, and (iii) a third term representing the workpiece frame with reference to the frame of the parent object, e.g., the pose of the workpiece within parent object or the pose of the workpiece within the grasp of parent object.

The one or more attributes of the workpiece state data structure 122 can help the task planner 115 characterize the pose of the workpiece, and the respective parent object handling the workpiece, to generate valid tasks that will transition the workpiece from a current state to a next workpiece state. That is, the workpiece state data structure 122 can help the task planner 115 determine the tasks that are kinematically feasible given the current phase of the workpiece, the parent object and the respective poses of the workpiece and the parent object.

The workcell task interface 124 can define a task of the robotic process. For example, in a bending application, the tasks can include SuctionPickFromPallet, PlaceInAligner, PinchPickWorkpiece.

Each task implementation can have one or more parameterizations in order to generate multiple possible target states as outcomes. That is, each task implementation can select a grasp annotation from a set of one or more grasp annotations for the task to generate a possible target state. As a specific example, SuctionPickFromPallet can pick up the workpiece from the left or from the right side of the workpiece, resulting in two implementations of SuctionPickFromPallet that each generate a possible target state.

The workcell task interface 124 can include one or more methods that can be used by the task planner 115 to generate a search graph for the robotic process.

The one or more methods can include an evolve state method, and a behavior tree node method.

The evolve state method can check if the workcell task could achieve the set target state from the given start state. That is, the evolve state method evaluates the feasibility of the task to transition the workpiece from the given start state to the set target state. For example, in a bending application, the evolve state method can evaluate whether SuctionPickFromPallet is a valid task to execute given the start state WorkpieceinPallet and the target state WorkpieceinSuctionGripper.

The evolve state method can return the target state as the outcome if the task is determined to be feasible, or valid.

In some implementations, the evolve state method can evaluate the feasibility of the task using inverse kinematics.

The behavior tree node method can generate a behavior tree node, or a segment of the behavior tree, for the task when generating the behavior tree 133 from the selected path in the graph. That is, if the task is within the selected path of the graph, the task planner 115 can utilize the behavior tree node method to generate a behavior tree node for the task.

The behavior tree node method can generate an action node for the task, or in some implementations, can generate a segment of the behavior tree for the task. That is, in some implementations, the task can require one or more nodes in the behavior tree.

In some implementations, the task can include a loop node. For example, in a bending application, the BendWorkpiece task can occur in a loop in the robotic process, so the behavior tree can represent the BendWorkpiece task using a loop control node and a BendWorkpiece action node.

The behavior tree node method can utilize the workpiece starting state, the object world, a skill provider, and a resource provider to generate a behavior tree node, or a segment of the behavior tree, for the task.

The starting state can represent the workpiece state at the start of the task. The object world can represent the operating environment of the robot.

The skill provider can be used to construct skill nodes. To execute a task, the robot can require one or more skills. A skill is a collection of preconfigured data and software, e.g., a machine learning control model, that provides a robot a capability to perform a task or a portion of a task represented by an action node. That is, in order to represent a task in a behavior tree, the behavior tree node method can construct skill nodes for the tasks, creating a behavior tree segment for the task. For example, the BendWorkpiece task can represent placing the workpiece into the bending machine and actuating the bending machine. In this example, the behavior tree segment for the task would include a set of skills such as move_robot and command_trubend to implement the bending behavior. The resource provider can be used to obtain resources required for construction skill nodes.

The task factory 126 can receive data representing the domain knowledge of the robot, the workpiece, and the machine, e.g., the bending machine in a bending application. The data can include the dimensions and shape of the workpiece, all of the possible ways the workpiece can be grasped using manual or automatic grasp annotation tools, the one or more tools of the robot, the dimensions and shape of the tools of the robot, the dimensions of the one or more components of the machine, the sequence of tasks of the robotic process, e.g., which tasks precede other tasks, and any other information relevant to the machine tending application.

In some implementations, the data can further include data from a data repository relevant to the robotic process. For example, in a bending application, the data from the data repository can include the sequence of bends to be performed and bending poses 113 from the bending machine, e.g., the necessary pose of the workpiece in the bending machine for each bend in the sequence of bends.

Using the data, the task factory 126 can return a list of all possible instances of workcell task implementations for a given state. More specifically, the task factory 126 can generate all possible parameterizations of all possible workcell tasks for a given state for the workpiece 168.

In some implementations, the task planner 115 can use robot reachability and motion planning tests to check if collision free motions are possible for performing a task given the state of the workpiece. The task factory 126 can use these pre-checks to determine the possible tasks for the given state of the workpiece 168.

The state expansion function 128 is a function that can (i) identify the set of tasks that can be executed from the current state, and (ii) define how the workpiece state transforms when said task is applied. The task planner 115 can generate the search graph of states and corresponding tasks using the state expansion function 128. Using the state expansion function 128, the task planner 115 can iteratively expand the search graph from a start state to a goal state.

The search graph is described in further detail with reference to FIG. 2.

After generation of the search graph using the state expansion function 128, the task planner 115 can perform a graph search to generate a sequence of feasible tasks to transition the workpiece from a start state to a goal state.

In some implementations, the task planner 115 can perform a state space search to generate a sequence of tasks for the end-to-end robotic process for a machine tending application. In some implementations, the generated sequence of tasks to transition the workpiece from a start space to a goal state can be a portion of the robotic process for the machine tending application.

The task planner 115 can utilize any appropriate search algorithm to identify the sequence of tasks to transition the workpiece from a start state to a goal state.

In some implementations, the task planner 115 can utilize a best-first-search algorithm to identify the sequence of tasks. That is, the task planner can identify the sequence of tasks by choosing the next task that transitions the workpiece from a current state to a target state based on a heuristic that estimates the best path to the goal.

In some implementations, the best-first-search algorithm can be a greedy best-first-search algorithm. The greedy best-first-search algorithm can choose the next task for the sequence of tasks by choose the task based solely on the heuristic estimate, which represents the estimated cost from the target state to the goal state. That is, the greedy algorithm can look forward and chooses the best target state for the workpiece based on the estimated cost to transition from that target state to the goal state.

In some implementations, the best-first-search algorithm can be an A* search algorithm. The A* search algorithm can use a combined cost function to choose the next task by choosing the task based on (i) the actual cost from the current state to the target state, and (ii) the heuristic estimate from the target state to the goal state. That is, the A* search algorithm can consider the cost to transition from the first state to the second state, while also looking forward to the cost of the transition from the second state to the goal state.

The heuristic used in the best-first-search algorithm can be any appropriate heuristic for the machine tending application. For example, in a bending application, the heuristic can be the number of robot joints displaced, number of different grasp annotations used, the number of different tools of the robot used, or any other appropriate heuristic for a bending application.

The heuristic of search algorithms can be influenced by one or more task planning criteria. The one or more task planning criteria can include feasibility, speed, safety, stability, and efficiency. For example, the heuristic can be the number of robot joints displaced, and can be influenced by stability, feasibility, safety, and efficiency.

The selecting of a path of tasks to execute the robotic process and the generation of a behavior tree from the selected tasks is described in further detail with reference to FIGS. 2 and 3.

Figure 2:
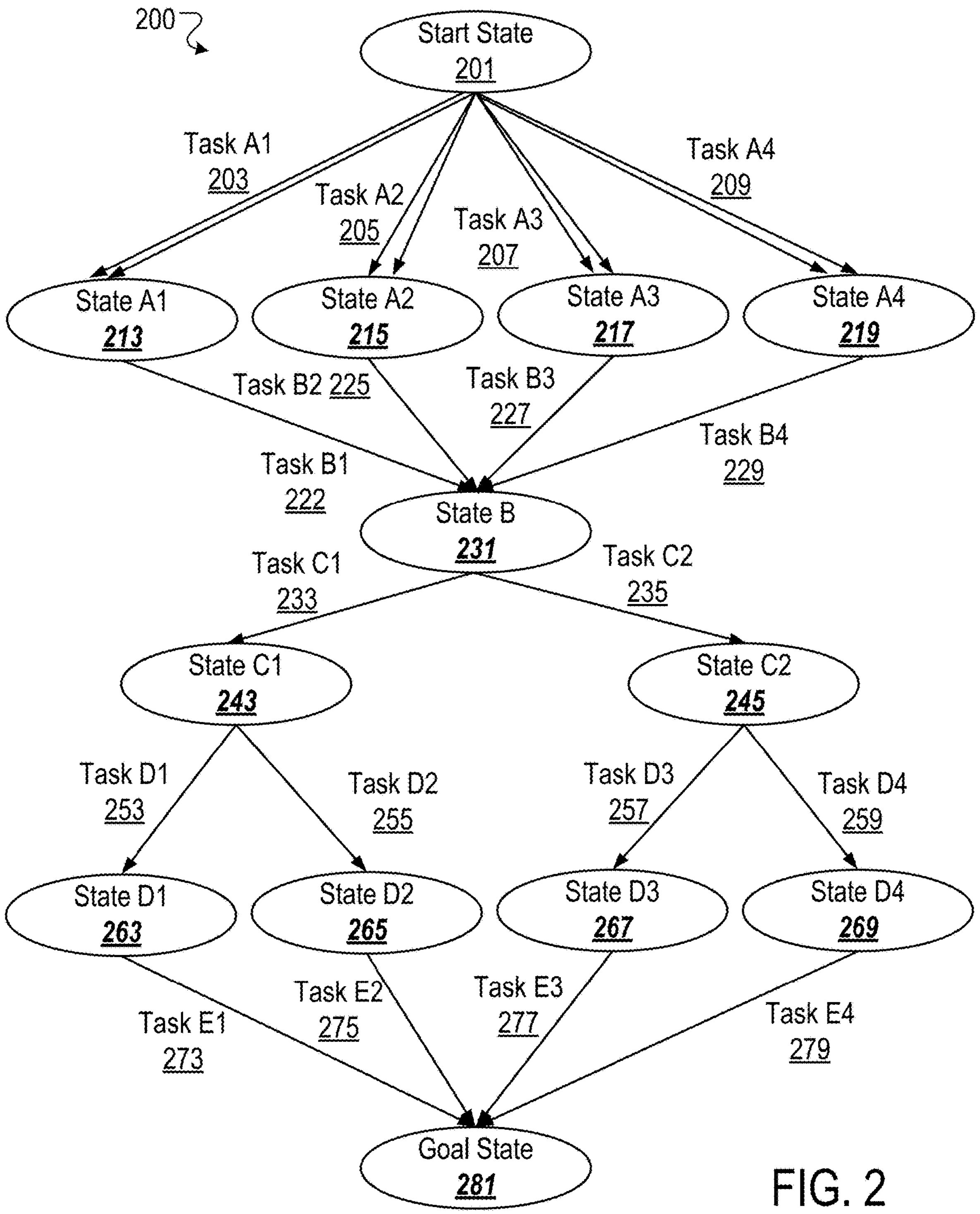
FIG. 2 is an example graph search.

FIG. 2 is an example search graph 200 that can be generated by the automated task planning system 100 of FIG. 1 using the task planner 115.

The search graph 200 can represent the one or more tasks in a sequence of tasks required to transition the workpiece from a starting state 201 to a goal state 281 in a machine tending application. The machine tending application is an automated robotic process that through the sequence of tasks manipulates a workpiece from one state to another state. For example, in a bending application, the robot can, through one or more tasks, move the workpiece to various poses within the workcell to bend the workpiece in a specific manner dictated by the bending machine.

The search graph 200 can include one or more nodes representing the various states of the workpiece during the end-to-end task sequence, where the nodes are connected by edges representing the task that transitions the workpiece from one state to another. For example, in a bending application, a workpiece can transition from the WorkPieceInPallet state to the WorkPieceInSuctionGripper state by the SuctionPickFromPallet task. In this example, the search graph 200 can connect the WorkPieceInPallet node to the WorkPieceInSuctionGripper node using the SuctionPickFromPallet edge.

The search graph 200 can include a starting state 201 that represents the current state of the workpiece using the workpiece state data structure 122 of FIG. 1.

In some implementations, the starting state 201 can represent the state of the untouched workpiece at the beginning of the end-to-end task sequence for the robotic process. For example, in a bending application, the starting state 201 can be the WorkpieceinPallet state representing the state of the workpiece when it is in the pallet waiting for the bending process.

In some implementations the starting state 201 can be a state of the workpiece that is in the middle of the end-to-end task sequence. For example, the starting state 201 can be the WorkpieceinAligner state representing the state of the workpiece when it is aligned to be picked up by the pinch gripper and placed in the bending machine to be bent.

From the starting state 201 of the workpiece, the task planner 115 can use the state expansion function 128 to identify the set of tasks that can be executed from the starting state from the list of all possible tasks from the task factory 126. That is, using the list of all possible tasks, the state expansion function 128 can identify the set of tasks that are valid and/or kinematically feasible given the starting state 201. That is, the state expansion function 128 can determine the tasks that are valid from the current state of the workpiece given the workpiece state. For example, in a bending application, a BendWorkpiece task would not be valid for a workpiece in a WorkPieceinPallet state as the workpiece is not in the bending machine. The state expansion function 128 can also utilize the evolve state method of the workcell task to determine whether the task is kinematically feasible given the starting state 201.

From the starting state 201, the search graph 200 can include the one or more tasks that the robot can execute to transition the workpiece from the start state 201 to a target state. For example, as depicted in FIG. 2, from start state 201, the robot can execute four distinct tasks: task A1 203, task A2 205, task A3 207 and task A4 209. Each respective task results in a distinct target state.

The one or more target states can represent the states of the workpiece in the middle of the end-to-end task sequence of the robotic process. For example, in a bending application, a target state of the workpiece can be WorkpieceInSuctionGripper that can represent the state of the workpiece when picked up by the suction gripper off of the pallet.

As another example, in a bending application, a target state of the workpiece can be WorkpieceInBendingMachine that can represent the state of the workpiece later in the bending process, right after it has been placed in the bending machine, but before it has been bent.

For each respective task that the robot can execute from the start state 201, the search graph 200 can include a respective target state node. For example, SuctionPickFromPallet results in a different target state than GripperPickFromPallet as the workpiece is being picked up using a different parent object of the robot, e.g., different tool. Therefore, the search graph 200 can use different target state nodes to characterize the workpiece after each distinct task. For example, task A1 203 can result in state A1 213 while task A2 215 can result in state A2 215.

The search graph can expand to nodes for each of the target states corresponding to the one or more distinct tasks: state A1 213, state A2 215, state A3 217, and state A4 219.

For each respective task, the task planning system 100 can select a respective grasp annotation that specifies how the robot will grasp the workpiece while performing the task. In some implementations, the task can be achieved using one or more grasp annotations of the robot. That is, the tool of the robot can grasp the workpiece in or more ways when executing a task. As a specific example, in a bending application, for a SuctionPickFromPallet task, the robot can grasp the workpiece from the left or from the right, in a horizontal or a vertical manner, etc. using the suction grasp tool.

From each of the one or more target states, the search graph 200 can repeat the process and expand to include the next target states after performing one or more tasks. That is, each target state A node can include one or more tasks that transition the state A nodes to the next target state, e.g., state B nodes. For example, state A1 213 can include task B1 222 that transitions state A1 213 to state B 231.

The search graph 200 can repeat the above described process until a goal state 281 is reached.

After the search graph 200 is generated, the task planner 115 can utilize the graph search algorithm to select a path through the search graph 200, e.g., a sequence of tasks, to transition the workpiece from the start state 201 to the goal state 281.

The selected path is then used to generate a behavior tree for the robot to execute.

The structure and execution of a behavior tree is described in further detail below with reference to FIGS. 3A and 3B.

Figure 3A:
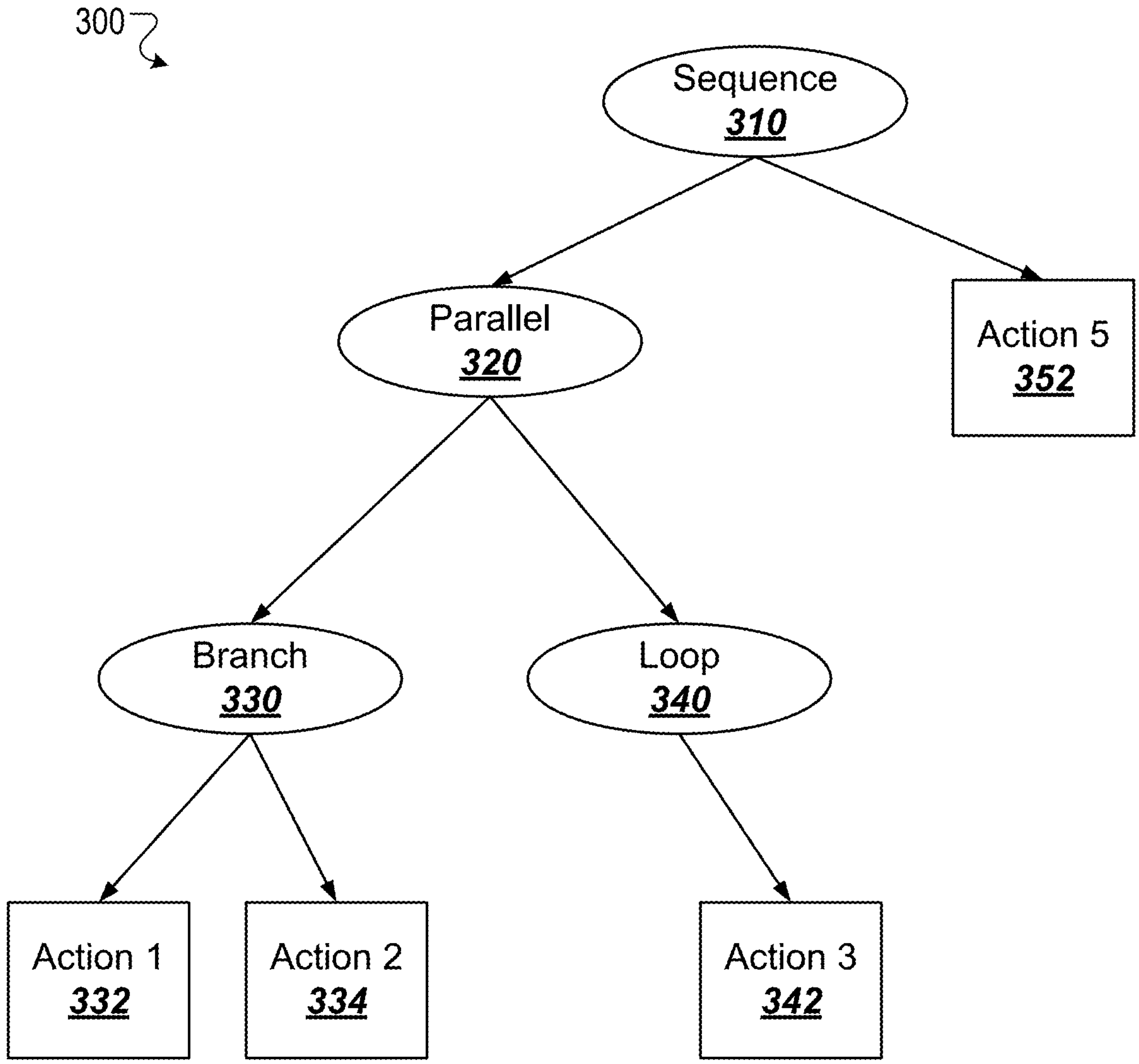
FIG. 3A is a diagram of an example behavior tree.

FIG. 3A is a diagram of an example behavior tree. The oval-shaped nodes 310, 320, 330, and 340 are control nodes, and the square-shared nodes 332, 334, 342, and 352 are action nodes. A system can represent a robotic process with a behavior tree as shown.

Node semantics of the control nodes dictate how an execution system will walk through nodes of the behavior tree to direct the robotic process. As one example, a sequence node, e.g., the sequence node 310 dictates that a real-time robotic control system of the robot should process all of its child nodes in a particular order specified by the behavior tree. Thus, the execution system would process the sequence node 320 before processing the action node 352.

On the other hand, a parallel node 320 specifies that the real-time robotic control system should process all of its child nodes at least partially in parallel. The mechanism for implementing parallel execution in practice depends on the configuration of the operating environment. For example, the real-time robotic control system can command multiple components in the workcell, e.g., a joint move and a gripper close, by providing commands sequentially but which are executed by their respective components at least partially in parallel. Alternatively, or in addition, the real-time robotic control system can launch multiple threads that execute in parallel to effectuate the specified actions.

Action nodes, e.g., the action nodes 332, 334, 342, and 352, represent distinct actions to be performed by a robot. For example, an action node can represent moving an end effector of a robot to a particular location in a workcell. Action nodes can also represent more sophisticated tasks, such as making a weld or inserting a connector into a socket. In some implementations, the action nodes are implemented using a skill, which is a collection of preconfigured data and software, e.g., a machine learning control model, that provides a robot a capability to perform a task, or a portion of a task represented by an action node. Each skill may itself encapsulate a state machine that guides the robot through one or more subtasks in order to effectuate the full task. Suitable techniques for configuring robots to execute tasks using skills are described in commonly owned U.S. patent application Ser. No. 16/880,869, filed on May 21, 2020, which is herein incorporated by reference.

The example behavior tree also includes a branch node 330 and a loop node 340. The semantics of the branch node 330 represent an if-else control structure with an associated condition. If the condition holds, the system can evaluate the first action node 332. Otherwise, the system can evaluate the second action node 334.

The example behavior tree also includes a loop node 340. The loop node can re-execute its subtree until a particular condition is satisfied, which can include a counter reaching a particular number of iterations. Thus, the loop node 340 can cause the system to re-execution the action node 342 for a particular number of iterations.

Figure 3B:
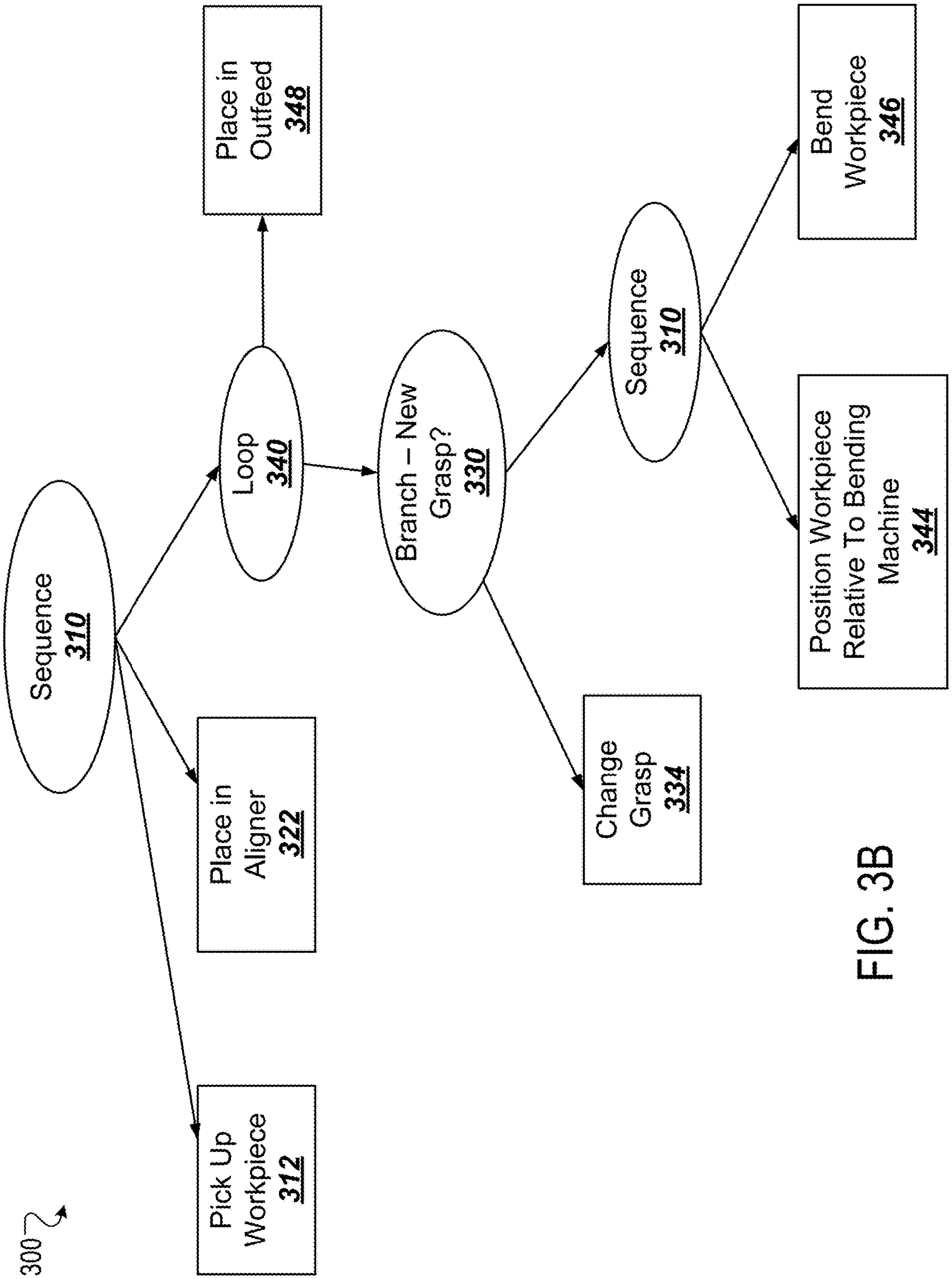
FIG. 3B is an example diagram of an example behavior tree for a bending application.

FIG. 3B is an example behavior tree for a bending application, e.g., bending a piece of sheet metal.

The behavior tree 300 can begin with a sequence node 310 that dictates the sequence of actions that the robot, e.g., the robot 164 of FIG. 1, should execute to perform the bending process for the workpiece.

To begin, the robot can pick up the workpiece 312. As described above, each task corresponds to a specific grasp annotation, e.g., how the workpiece is grasped by the robot. For example, the action 312, i.e., picking up the workpiece, can correspond to grasping the workpiece from the right side of the workpiece using the suction grasp tool.

The robot can then place the workpiece in the aligner 322.

The robot can then begin the bending phase of the process. To do so, the robot enters a bending loop in the behavior tree 300. That is, the robot continues to execute the actions under the loop node until the workpiece is sufficiently bent.

The robot can include a branch node 330 with a new branch condition that indicates whether the robot needs a new grasp for the workpiece. For example, the robot can change the grasp 334 of the workpiece after the first bend of the workpiece and before a second bend of the workpiece.

If a new grasp is not needed, the robot can execute the bending sequence 310, which includes first positioning the workpiece relative to the bending machine 344 and then bending the workpiece 346.

The robot can continue executing this loop 340 until the workpiece is sufficiently bent.

After the bending phase, the robot can exit the loop 340 and place the workpiece in outfeed 348, executing the last action to complete the task plan dictated by the behavior tree 300 for the bending process.

Figure 4A:
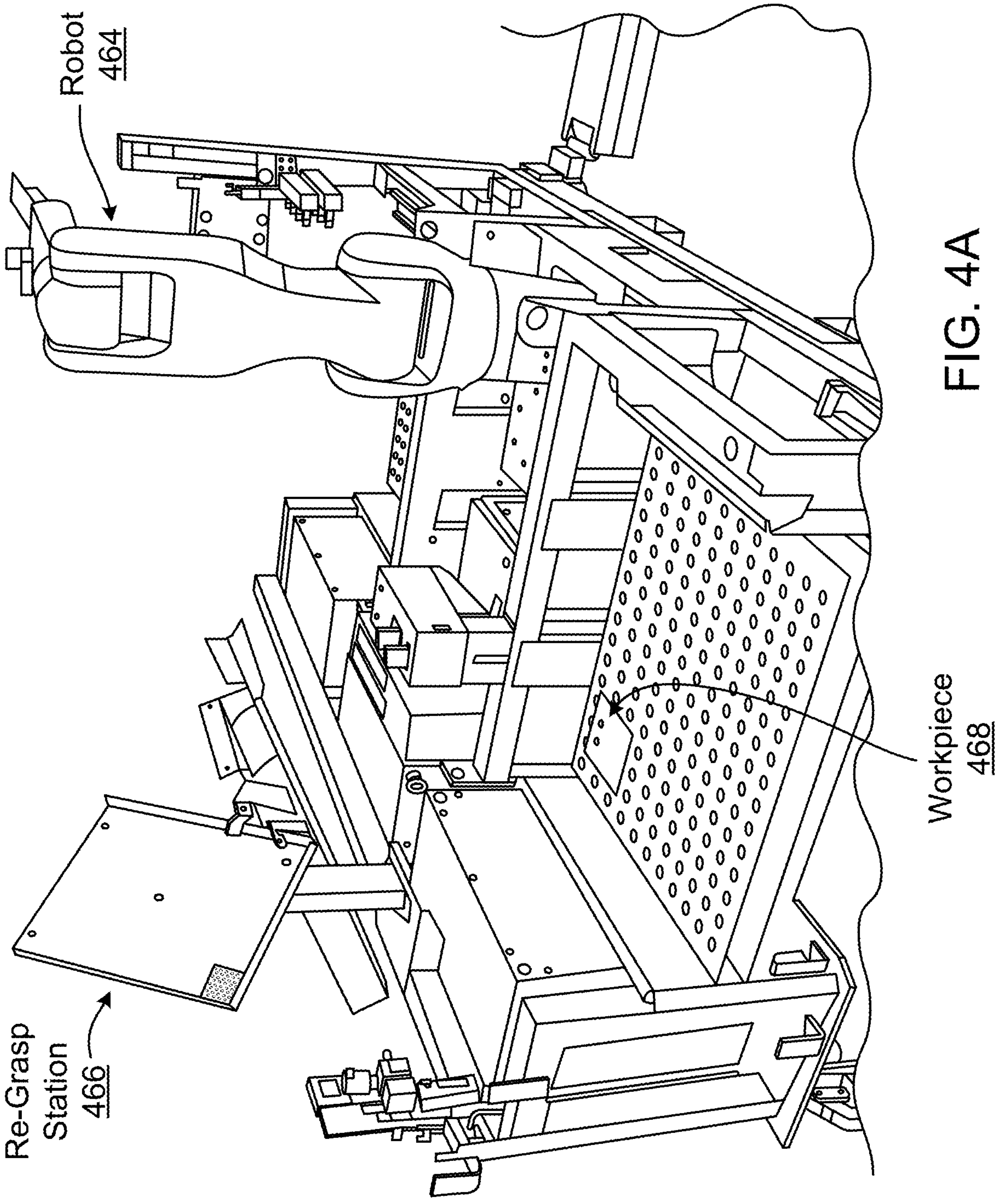
FIGS. 4A, 4B, and 4C show the workpiece in various states during an example bending process.
Figure 4B:
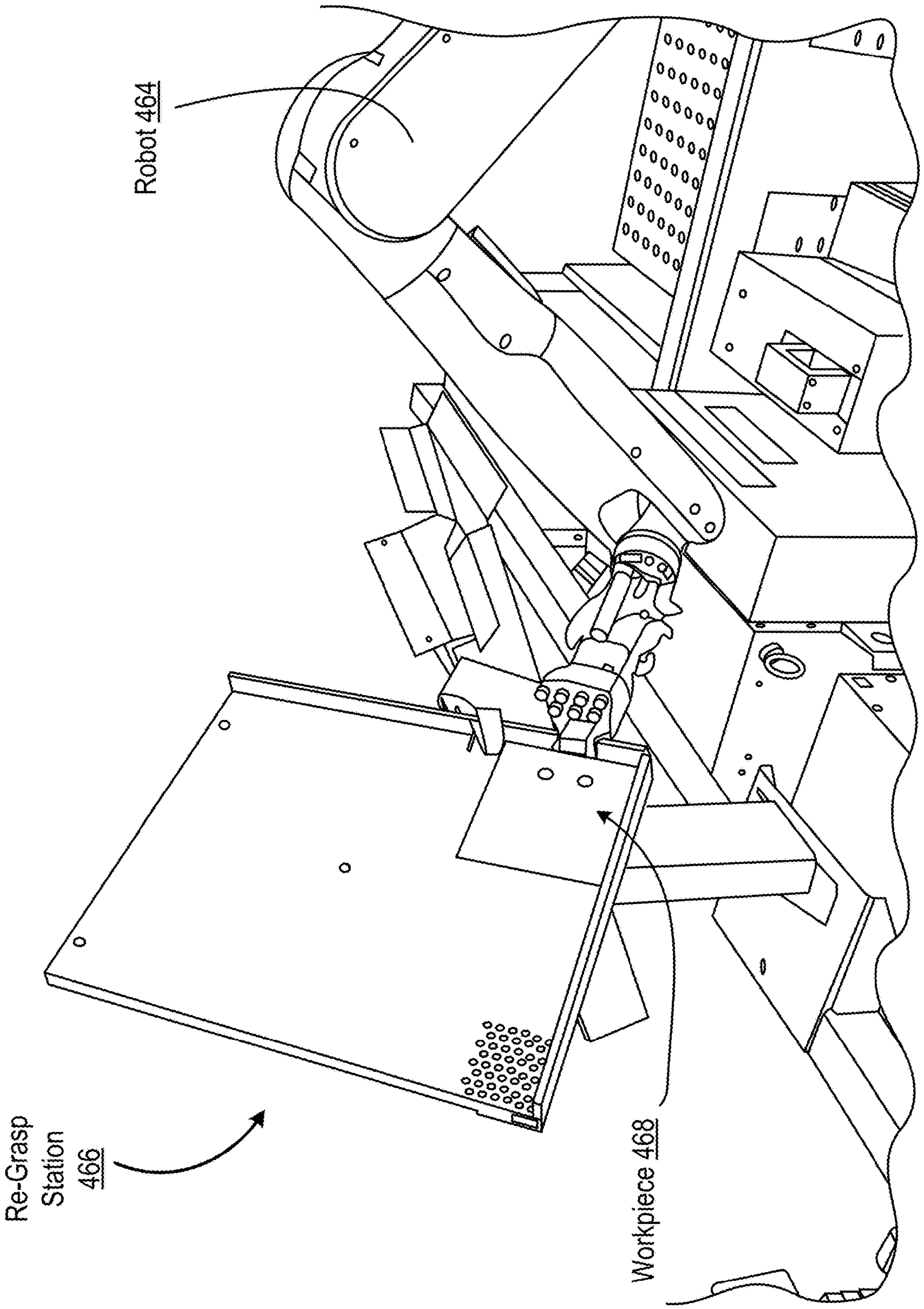
Figure 4C:
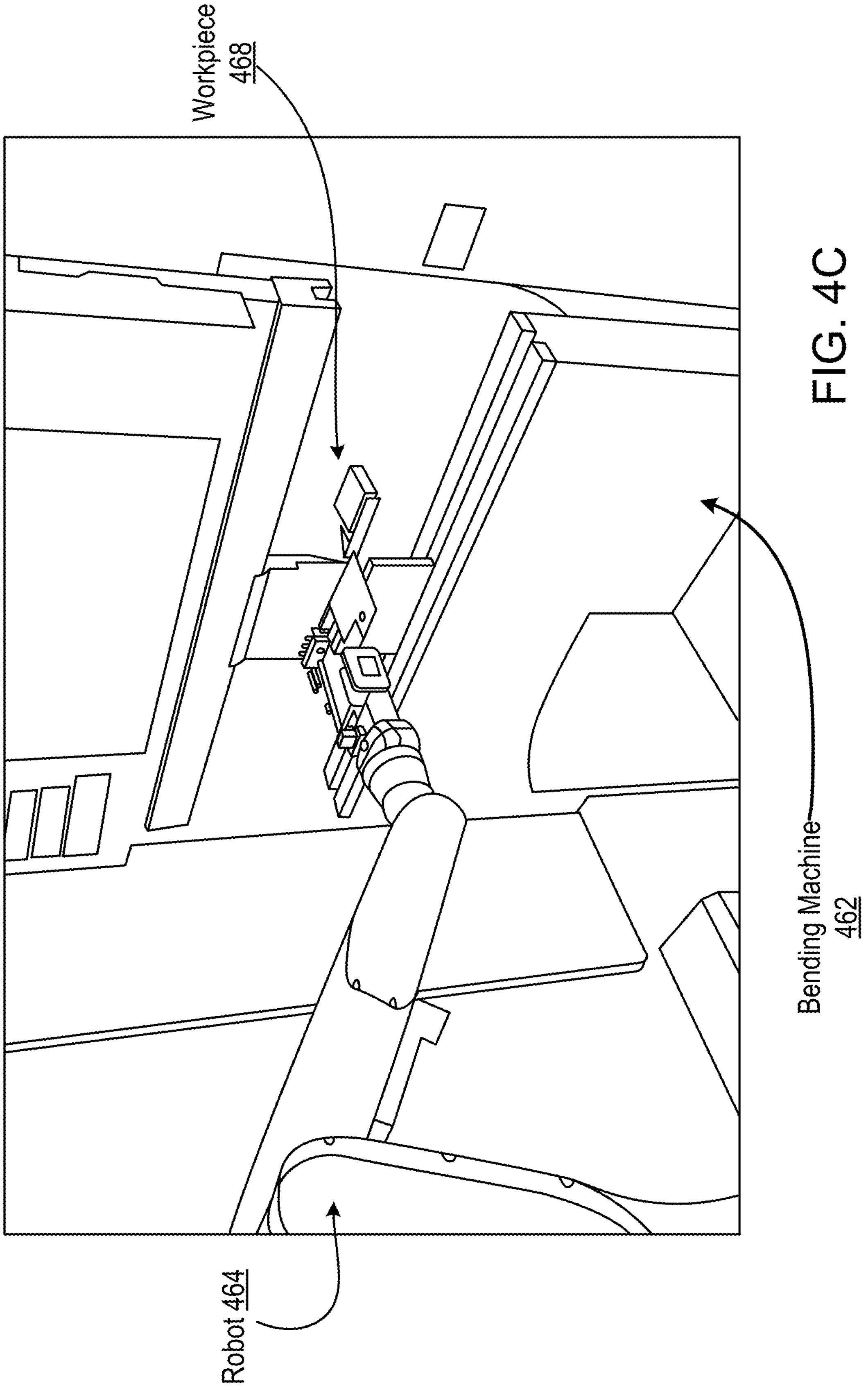

FIGS. 4A, 4B, and 4C illustrate a workpiece 468 in various states in the operating environment during an example bending process. More specifically, FIG. 4A illustrates a workpiece 468 in a pallet at the beginning of the example bending process, FIG. 4B illustrates the workpiece 468 a re-grasping station 466, and FIG. 4C illustrates the workpiece in the bending machine 462 for a bending application.

The automated task planning process described in this specification can take the operating environment properties, such as the re-grasping station 466, and automatically generate a plan to bend the workpiece with an intermediate regrasp as shown in these figures.

That is, the automated task planning system can generate a plan for the bending process for the robot 464 to execute that can include the robot 464 grasping the workpiece 468 from the pallet, placing the workpiece 468 in the re-grasp station to adjust the grasp of the robot 464 on the workpiece 468, and placing the workpiece 468 in the bending machine 462 to be bent.

In some implementations, the operating environment does not include the re-grasping station 466 and the automated task planning process can automatically generate a plan for the robot 464 that does not include an intermediate regrasp.

FIG. 4A shows the workpiece 468 in the pallet at the beginning of the bending process. The operating environment can include the robot 164, the re-grasp station 466, the pallet, and the bending machine 462 (not pictured).

FIG. 4B shows the workpiece 468 in the re-grasp station 466 during the bending process. The robot 464 can place the workpiece 468 in the re-grasp station 466 to adjust the grasp of the workpiece 468. For example, in this specific example, the robot can switch from grasping the workpiece from the top with the suction grasp tool to grasping the workpiece from the right side using the pinch grasp tool. FIG. 4C shows the workpiece 468 in the bending machine 462. The robot 464 can place the workpiece 468 in the bending machine 464 to be bent.

Figure 5:
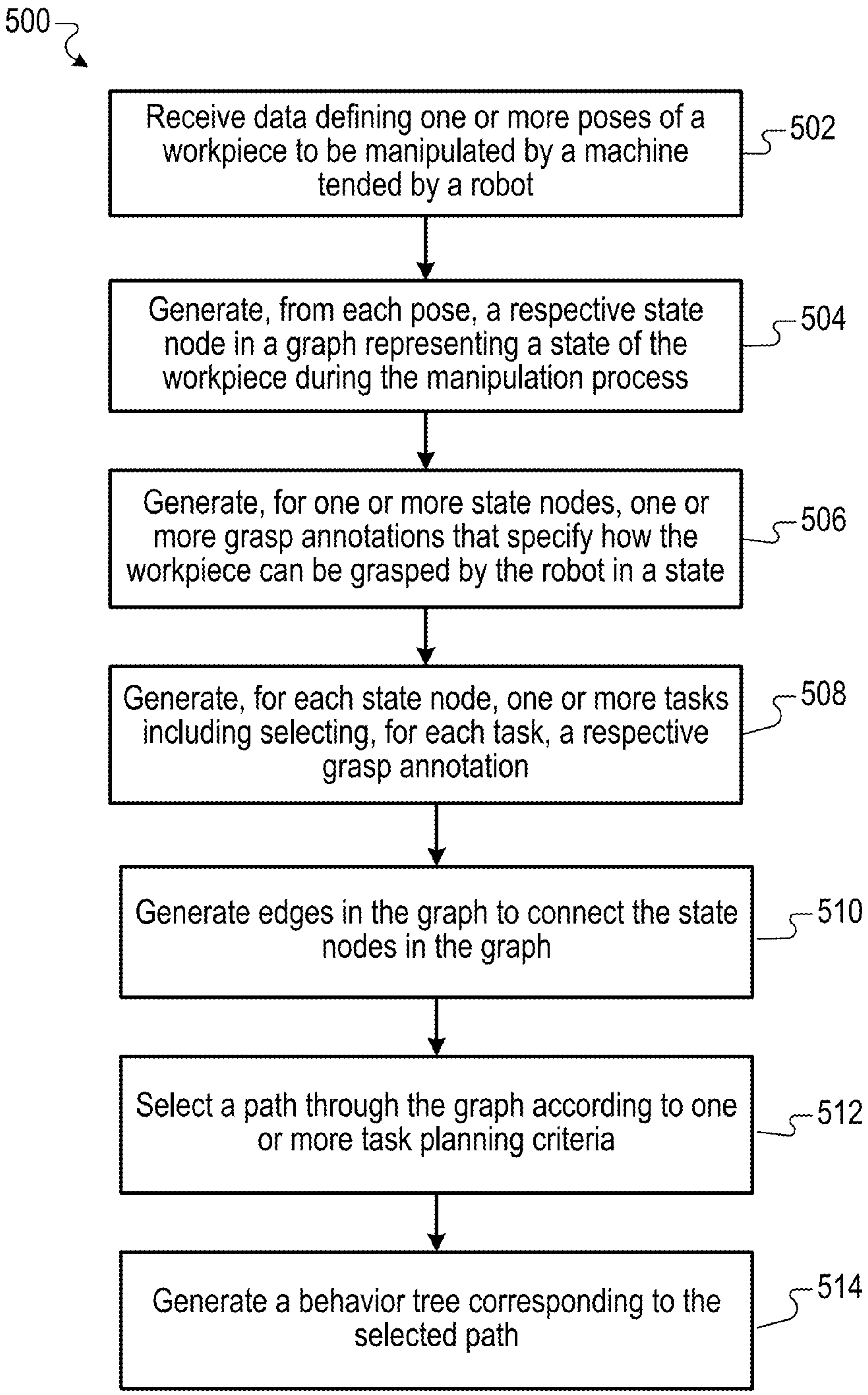
FIG. 5 is a flow diagram of an example task planning process.

FIG. 5 is a flow diagram of an example task planning process.

For convenience, the process 500 will be described as being performed by a system of one or more computers located in one or more locations. For example, an automated task planning system, e.g., the automated task planning system 100 depicted in FIG. 1, appropriately programmed in accordance with this specification, can perform the process 500.

The system can receive data defining one or more poses of a workpiece to be manipulated by a machine tended by a robot (step 502).

The machine can be any appropriate machine tended by a robot, including a bending machine, a welding machine, a stamping machine, or a polishing machine.

The workpiece can be any appropriate workpiece given the particular machine. For example, for a bending machine, the workpiece can be a sheet or metal, or a pipe or tube. As another example, in a polishing machine, the workpiece can be any automotive parts, such as car body panels, wheels, and engine parts.

Each pose can specify a position and an orientation of the workpiece with respect to the machine. That is, the pose can specify the coordinates and the angles or rotations of the workpiece with reference to the reference frame of the machine.

The system can generate, from each pose, a respective state node in a graph representing a state of the workpiece during the manipulation process (step 504).

In some implementations, the state of the workpiece can include the phase, parent object, and pose of the workpiece in the operating environment. That is, the state of the workpiece can include the phase of the machine process that the workpiece is in, the parent object that is currently interacting with and/or manipulating the workpiece, and the pose of the workpiece with respect to the parent object.

For example, in a bending application, the one or more phases can include the flat phase of the workpiece, the first bending phase, and the second bending phase. In this example, the one or more parent objects can include the pinch grasp tool, the suction grasp tool, the aligner, the bending machine, and the outfeed for the bending process.

The workpiece alignment represents the relative pose of the workpiece with respect to a reference object. For example, the pose can be defined with respect to the parent object. As another example, the pose of the workpiece can be defined with respect to the machine. As another example, the pose of the workpiece can be defined with respect to a reference frame of the workcell.

In some implementations, the workpiece alignment can be represented using a tuple with (i) a first term representing the frame of the workpiece with respect to the machine, (ii) a second term representing the frame of the parent object with respect to the machine, and (iii) a third term representing the workpiece frame with reference to the frame of the parent object, e.g., the pose of the workpiece within parent object or the pose of the workpiece within the grasp of parent object.

The system can generate, for one or more state nodes, one or more grasp annotations that specify how the workpiece can be grasped by the robot in a state represented by the state node (step 506).

The one or more grasp annotations can include grasp annotations that specify that the workpiece is being grasped from the left or right sides, the angle of the grasp, grasping in a horizontal or vertical manner, etc.

In some implementations, the robot can be configured to use one or more different grasping tools. For example, in a bending application, the one or more different grasping tools can include a pinch grasp tool and a suction grasp tool. In this example, each of the grasp annotations would specify one of the one or more grasping tools. For example, a grasp annotation can specify a grasp of the right side of the workpiece using the pinch grasp tool, which would differ from a grasp of the right side of the workpiece using the suction grasp tool.

The system can generate for each state node, one or more tasks including, selecting, for each task, a respective grasp annotation that specifies how the robot will grasp the workpiece while performing the task (step 508).

For each respective task, the system can select a respective grasp annotation for the task. In some implementations, the task can be achieved using one or more grasp annotations of the robot. That is, the robot can grasp the workpiece in or more ways when executing a task. As a specific example, in a bending application, for a SuctionPickFromPallet task, the robot can grasp the workpiece from the left or from the right, in a horizontal or a vertical manner, etc.

In some implementations, when generating the one or more tasks for the state node, the system can check the feasibility of the task. That is, the system can check the inverse kinematics of the current pose of the workpiece to determine whether the task is kinematically feasible given the state node.

The system can generate edges in the graph to connect state nodes in the grasp, each edge representing a respective task of tasks generated for the state nodes (step 510).

Each state node can have one or more edges connecting the state node to one or more intermediate nodes.

Tasks are deterministic meaning that each respective task connects a current state node to a respective target state node. For example, in a bending application, picking up the workpiece using a pinch grasp tool and suction grasp tool can be represented as two separate tasks in the graph and connect the same starting state node to two respective target state nodes.

The system can select a path through the graph according to one or more task planning criteria (step 512).

After generation of the graph, the system can perform a graph search to select a path through the graph.

In some implementations, the system can perform a graph search to generate a sequence of tasks for the end-to-end robotic process for a machine tending application. In some implementations, the selected path can be a portion of the robotic process for the machine tending application. That is, the starting state of the workpiece can be a target state of the search graph and therefore, the selected path through the graph is only a portion of the graph and a portion of the robotic process for the machine tending application.

The system can utilize any appropriate search algorithm to select the path through the graph.

In some implementations, the system can utilize a best-first-search algorithm to identify the path. That is, the task planner can identify the path by choosing the target state node based on a heuristic that estimates the best path to the goal.

In some implementations, the best-first-search algorithm can be a greedy best-first-search algorithm. The greedy best-first-search algorithm can choose the target state node by choosing the target state node based solely on the heuristic estimate, which represents the estimated cost from the target state node to the goal state node. That is, the greedy algorithm can look forward and choose the best target state for the workpiece based on the estimated cost to get from that target state node to the goal state node.

In some implementations, the best-first-search algorithm can be an A* search algorithm. The A* search algorithm can use a combined cost function to choose the task by choosing the task based on (i) the actual cost from the current state node to the target state node, and (ii) the heuristic estimate from the target state node to the goal state node. That is, the A* search algorithm can consider the cost to transition from the current state node to the target state node, while also looking forward to the cost of the transition from the target state node to the goal state node.

The heuristic used in the best-first-search algorithm can be any appropriate heuristic for the machine tending application. For example, in a bending application, the heuristic can be the number of robot joints displaced, number of different grasp annotations used, the number of different tools of the robot used, or any other appropriate heuristic for a bending application.

The heuristic of search algorithms can be influenced by one or more task planning criteria. The one or more task planning criteria can include feasibility, speed, safety, stability, and efficiency. For example, the heuristic can be the number of robot joints displaced, and can be influenced by stability, feasibility, safety, and efficiency.

The system can generate a behavior tree corresponding to the selected path where the leaves of the behavior tree are action nodes corresponding to the tasks represented by edges of the graph (step 514).

Following the selected path of the search graph, the system can generate a behavior tree starting with a sequence node where each of the tasks represented by the edges of the graph is an action node of the behavior tree.

The generation of the behavior tree is described in further detail above with reference to FIGS. 3A and 3B.

In some implementations, the system can generate another form of output that represents the sequence of tasks in the selected path of the search graph. The robot can then execute the sequence of tasks, or task plan, utilizing the other output in any appropriate manner for the output form.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Signa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a computer-implemented method comprising:

- receiving data defining one or more poses of a workpiece to be manipulated by a machine tended by a robot, wherein each pose specifies a position and an orientation of the workpiece with respect to the machine;
- generating, from each pose, a respective state node in a graph representing a state of the workpiece during the manipulation process;
- generating, for one or more state nodes, one or more grasp annotations that specify how the workpiece can be grasped by the robot in a state represented by the state node;
- generating, for each state node, one or more tasks including selecting, for each task, a respective grasp annotation that specifies how the robot will grasp the workpiece while performing the task;
- generating edges in the graph to connect state nodes in the grasp, each edge representing a respective task of tasks generated for the state nodes;
- selecting a path through the graph according to one or more task planning criteria;
- generating a behavior tree corresponding to the selected path, wherein leaves of the behavior tree are action nodes corresponding to the tasks represented by edges of the graph.

Embodiment 2 is the method of claim 1, providing the generated behavior tree to a real-time robotic control system, thereby causing the robot to move the workpiece to each of the one or more poses for manipulating the workpiece with the machine.

Embodiment 3 is the method of any one of embodiments 1-2, wherein the machine is a bending machine.

Embodiment 4 is the method of any one of embodiments 1-3, wherein generating the tasks comprises checking for feasibility.

Embodiment 5 is the method of embodiment 4, wherein checking for feasibility comprises checking inverse kinematics of the pose of the workpiece.

Embodiment 6 is the method of any one of embodiments 1-5, wherein the robot is configured to use a plurality of different grasping tools.

Embodiment 7 is the method of embodiment 6, wherein the plurality of different grasping tools comprises a pinch grasp tool and a suction grasp tool.

Embodiment 8 is the method of any one of embodiments 6-7, wherein each graph annotation specifies one of the plurality of different grasping tools.

Embodiment 9 is the method of any of embodiments 1-8, wherein the one or more task planning criteria comprise feasibility, speed, safety, stability, cost, and efficiency.

Embodiment 10 is the method of any of the embodiments 1-9, wherein one or more of the task planning criteria influence a graph heuristic used to select the path through the graph.

Embodiment 11 is the method of any of the embodiments 1-10, wherein the behavior tree comprises (i) one or more parent nodes, (ii) one or more leaf nodes, and (iii) one or more links representing parent-child relationships.

Embodiment 12 is the method of embodiment 11, wherein the one or more parent nodes of the behavior tree are control nodes, the one or more leaf nodes of the behavior tree are action nodes corresponding to a respective task, and the one or more links are grasp annotations for the respective task.

Embodiment 13 is the method of embodiment 12, wherein the one or more tasks are generated by a task generation engine.

Embodiment 14 is a system comprising: one or more computers and one or more storage devices storing instructions that are operable, when executed by the one or more computers, to cause the one or more computers to perform the method of any one of embodiments 1 to 13.

Embodiment 15 is a computer storage medium encoded with a computer program, the program comprising instructions that are operable, when executed by data processing apparatus, to cause the data processing apparatus to perform the method of any one of embodiments 1 to 13.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are corresponded to in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes corresponded to in the accompanying figures do not necessarily require the particular order shown, or sequential order, to achieve desirable results. In some cases, multitasking and parallel processing may be advantageous.

What is claimed is:

1. A computer-implemented method comprising:

receiving data defining one or more poses of a workpiece to be manipulated by a machine tended by a robot, wherein each pose specifies a position and an orientation of the workpiece with respect to the machine;

generating, from each pose, a respective state node in a graph representing a state of the workpiece during the manipulation process;

generating, for one or more state nodes, one or more grasp annotations that specify how the workpiece can be grasped by the robot in a state represented by the state node;

generating, for each state node, one or more tasks including selecting, for each task, a respective grasp annotation that specifies how the robot will grasp the workpiece while performing the task;

generating edges in the graph to connect state nodes in the grasp, each edge representing a respective task of tasks generated for the state nodes;

selecting a path through the graph according to one or more task planning criteria;

generating a behavior tree corresponding to the selected path, wherein leaves of the behavior tree are action nodes corresponding to the tasks represented by edges of the graph; and providing the generated behavior tree to a real-time robotic control system, thereby causing the robot to move the workpiece to each of the one or more poses for manipulating the workpiece with the machine.

2. The method of claim 1, wherein the machine is a bending machine.

3. The method of claim 1, wherein generating the tasks comprises checking for feasibility.

4. The method of claim 3, wherein checking for feasibility comprises checking inverse kinematics of the pose of the workpiece.

5. The method of claim 1, wherein the robot is configured to use a plurality of different grasping tools.

6. The method of claim 5, wherein the plurality of different grasping tools comprises a pinch grasp tool and a suction grasp tool.

7. The method of claim 5, wherein each graph annotation specifies one of the plurality of different grasping tools.

8. The method of claim 1, wherein the one or more task planning criteria comprise feasibility, speed, safety, stability, cost, and efficiency.

9. The method of claim 1, wherein one or more of the task planning criteria influence a graph heuristic used to select the path through the graph.

10. The method of claim 1, wherein the behavior tree comprises (i) one or more parent nodes, (ii) one or more leaf nodes, and (iii) one or more links representing parent-child relationships.

11. The method of claim 10, wherein the one or more parent nodes of the behavior tree are control nodes, the one or more leaf nodes of the behavior tree are action nodes corresponding to a respective task, and the one or more links are grasp annotations for the respective task.

12. The method of claim 1, wherein the one or more tasks are generated by a task generation engine.

13. A system comprising one or more computers and one or more storage devices storing instructions that are operable, when executed by the one or more computers, to cause the one or more computers to perform operations comprising:

receiving data defining one or more poses of a workpiece to be manipulated by a machine tended by a robot, wherein each pose specifies a position and an orientation of the workpiece with respect to the machine;

generating, from each pose, a respective state node in a graph representing a state of the workpiece during the manipulation process;

generating, for one or more state nodes, one or more grasp annotations that specify how the workpiece can be grasped by the robot in a state represented by the state node;

generating, for each state node, one or more tasks including selecting, for each task, a respective grasp annotation that specifies how the robot will grasp the workpiece while performing the task;

generating edges in the graph to connect state nodes in the grasp, each edge representing a respective task of tasks generated for the state nodes;

selecting a path through the graph according to one or more task planning criteria;

generating a behavior tree corresponding to the selected path, wherein leaves of the behavior tree are action nodes corresponding to the tasks represented by edges of the graph;

providing the generated behavior tree to a real-time robotic control system, thereby causing the robot to move the workpiece to each of the one or more poses for manipulating the workpiece with the machine.

14. The system of claim 13, wherein the machine is a bending machine.

15. The system of claim 13, wherein the robot is configured to use a plurality of different grasping tools.

16. The system of claim 15, wherein the plurality of different grasping tools comprises a pinch grasp tool and a suction grasp tool.

17. The system of claim 16, wherein each graph annotation specifies one of the plurality of different grasping tools.

18. A non-transitory computer storage medium encoded with a computer program, the program comprising instructions that are operable, when executed by data processing apparatus to cause the data processing apparatus to perform operations comprising:

receiving data defining one or more poses of a workpiece to be manipulated by a machine tended by a robot, wherein each pose specifies a position and an orientation of the workpiece with respect to the machine;

generating, from each pose, a respective state node in a graph representing a state of the workpiece during the manipulation process;

generating, for one or more state nodes, one or more grasp annotations that specify how the workpiece can be grasped by the robot in a state represented by the state node;

generating, for each state node, one or more tasks including selecting, for each task, a respective grasp annotation that specifies how the robot will grasp the workpiece while performing the task;

generating edges in the graph to connect state nodes in the grasp, each edge representing a respective task of tasks generated for the state nodes;

selecting a path through the graph according to one or more task planning criteria;

generating a behavior tree corresponding to the selected path, wherein leaves of the behavior tree are action nodes corresponding to the tasks represented by edges of the graph;

providing the generated behavior tree to a real-time robotic control system, thereby causing the robot to move the workpiece to each of the one or more poses for manipulating the workpiece with the machine.

* * * * *